(12) United States Patent
Garner

(10) Patent No.: US 7,236,608 B2
(45) Date of Patent: Jun. 26, 2007

(54) CONDUCTORS FOR ELECTRO-DYNAMIC LOUDSPEAKERS

(75) Inventor: David B. Garner, Indianapolis, IN (US)

(73) Assignee: Harman International Industries, Incorporated, Northridge, CA (US)

(*) Notice: Subject to any disclaimer, the term of this patent is extended or adjusted under 35 U.S.C. 154(b) by 638 days.

(21) Appl. No.: 10/429,173

(22) Filed: May 2, 2003

(65) Prior Publication Data
US 2004/0008862 A1 Jan. 15, 2004

Related U.S. Application Data

(60) Provisional application No. 60/380,001, filed on May 2, 2002, provisional application No. 60/378,188, filed on May 6, 2002, provisional application No. 60/391,134, filed on Jun. 24, 2002.

(51) Int. Cl.
*H04R 25/00* (2006.01)
(52) U.S. Cl. .................. 381/399; 381/408; 381/423
(58) Field of Classification Search ............ 381/176, 381/399, 423, 426, 408, 313; 181/170
See application file for complete search history.

(56) References Cited

U.S. PATENT DOCUMENTS

| | | | |
|---|---|---|---|
| 1,643,791 A | 9/1927 | Slepian | |
| 3,141,071 A | 7/1964 | Rich | |
| 3,164,686 A | 1/1965 | Tibbetts | |
| 3,198,890 A | 8/1965 | Rich | |
| 3,570,626 A | 3/1971 | Mochida et al. | |
| 3,654,403 A | 4/1972 | Bobb | |
| 3,674,946 A | 7/1972 | Winey | |
| 3,919,499 A | 11/1975 | Winey | |
| 3,997,739 A * | 12/1976 | Kishikawa et al. | 381/408 |
| 4,037,061 A | 7/1977 | von Recklinghausen | |
| 4,210,786 A | 7/1980 | Winey | |
| 4,264,789 A | 4/1981 | Kaizu et al. | |
| 4,281,223 A | 7/1981 | Ugaji et al. | |
| 4,316,062 A | 2/1982 | Beveridge | |

(Continued)

FOREIGN PATENT DOCUMENTS

FR   2 765 767   1/1999

(Continued)

OTHER PUBLICATIONS

EDM Charmilles; A Practical Guide to Electro-Discharge Machining; Ateliers des Charmilles S. A. (p. 12-13).
"Line Arrays: Theory and Applications," Audio Engineering Society, Convention Paper 5304; Mark S. Ureda, JBL Professional, Northridge, CA; presented at the 110th Convention May 12-15, 2001, Amsterdam, The Netherlands.

(Continued)

*Primary Examiner*—Curt Kuntz
*Assistant Examiner*—Tuan Duc Nguyen
(74) *Attorney, Agent, or Firm*—Pauley Petersen & Erickson

(57) ABSTRACT

Electro-dynamic loudspeakers typically include a diaphragm that is secured to a frame and has a conductor applied to at least one surface of the diaphragm. The conductor is connected to a power amplifier for providing electric current through the linear traces of the conductor that interact with magnetic fields generated by magnets that are mounted to the frame. The interaction between the current passing through the conductor and the magnetic fields cause vibration in the diaphragm that creates the sound that is heard from the electro-dynamic loudspeaker. Different methodologies of forming the conductor are provided for simplifying the manufacturing process and for locating the conductor closer to the magnetic field generated by the magnets.

13 Claims, 11 Drawing Sheets

U.S. PATENT DOCUMENTS

| | | |
|---|---|---|
| 4,384,173 A | 5/1983 | Briefer et al. |
| 4,468,530 A | 8/1984 | Torgeson |
| 4,471,172 A | 9/1984 | Winey |
| 4,471,173 A | 9/1984 | Winey |
| 4,480,155 A | 10/1984 | Winey |
| 4,484,037 A | 11/1984 | Nieuwendijk et al. |
| 4,536,623 A | 8/1985 | Larson |
| 4,544,805 A | 10/1985 | Sawafuji et al. |
| 4,584,439 A | 4/1986 | Paddock |
| 4,653,103 A | 3/1987 | Mori et al. |
| 4,703,510 A | 10/1987 | Larson |
| 4,723,296 A | 2/1988 | Nieuwendijk et al. |
| 4,750,257 A | 6/1988 | Larson |
| 4,803,733 A | 2/1989 | Carver et al. |
| 4,837,838 A | 6/1989 | Thigpen et al. |
| 4,924,504 A | 5/1990 | Burton |
| 4,939,784 A | 7/1990 | Bruney |
| 5,021,613 A | 6/1991 | Garcia |
| 5,148,493 A | 9/1992 | Bruney |
| 5,195,143 A | 3/1993 | Spiegel |
| 5,764,595 A | 3/1993 | Spiegel et al. |
| 5,283,836 A | 2/1994 | Trufitt |
| 5,297,214 A | 3/1994 | Bruney |
| 5,430,805 A | 7/1995 | Stevenson et al. |
| 5,627,903 A | 5/1997 | Porrazzo et al. |
| 5,850,461 A | 12/1998 | Zelinka |
| 5,901,235 A | 5/1999 | Thigpen et al. |
| 5,905,805 A | 5/1999 | Hansen |
| 6,104,825 A | 8/1999 | Thigpen |
| 5,953,438 A | 9/1999 | Stevenson et al. |
| 5,961,762 A | 10/1999 | Zelinka et al. |
| 6,008,714 A | 12/1999 | Okuda et al. |
| 6,097,830 A | 8/2000 | Zelinka et al. |
| 6,154,557 A | 11/2000 | Montour et al. |
| 6,185,310 B1 | 2/2001 | Kermani et al. |
| 6,546,106 B2 | 4/2003 | Azima |
| 6,845,166 B2 | 1/2005 | Hara et al. |
| 2001/0005419 A1 | 6/2001 | Kermani et al. |
| 2001/0009586 A1 | 7/2001 | Suzuki |
| 2001/0048256 A1 | 12/2001 | Miyazaki et al. |
| 2002/0191808 A1 | 12/2002 | Croft, III et al. |

OTHER PUBLICATIONS

Furihata et al., "Acoustic characteristics of an electrodynamic planar digital loudspeaker." J Acoustical Society of America 114(1):174-184, Jul. 2003.

"Analysis of Loudspeaker Line Arrays" by Mark S. Ureda, J. Audio Eng. Soc., vol. 52 No. 5.. May 2004.

* cited by examiner

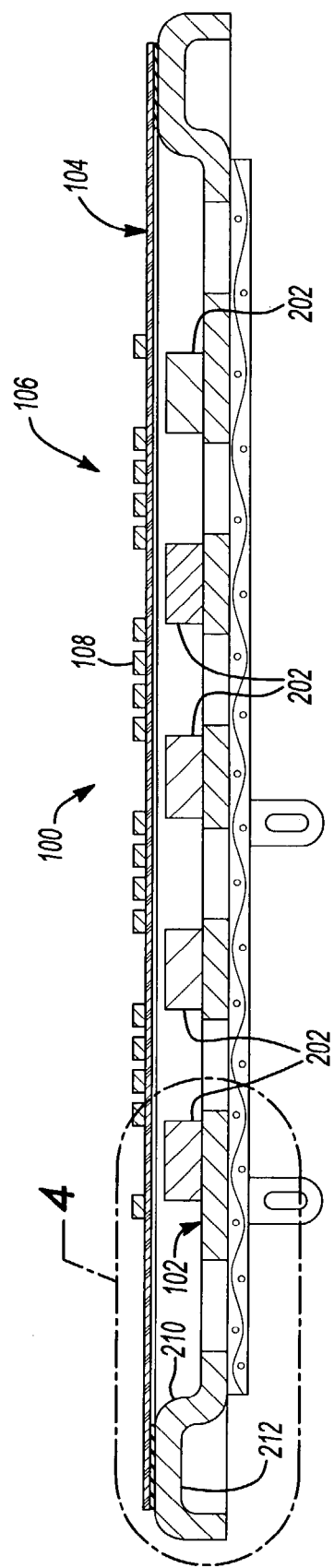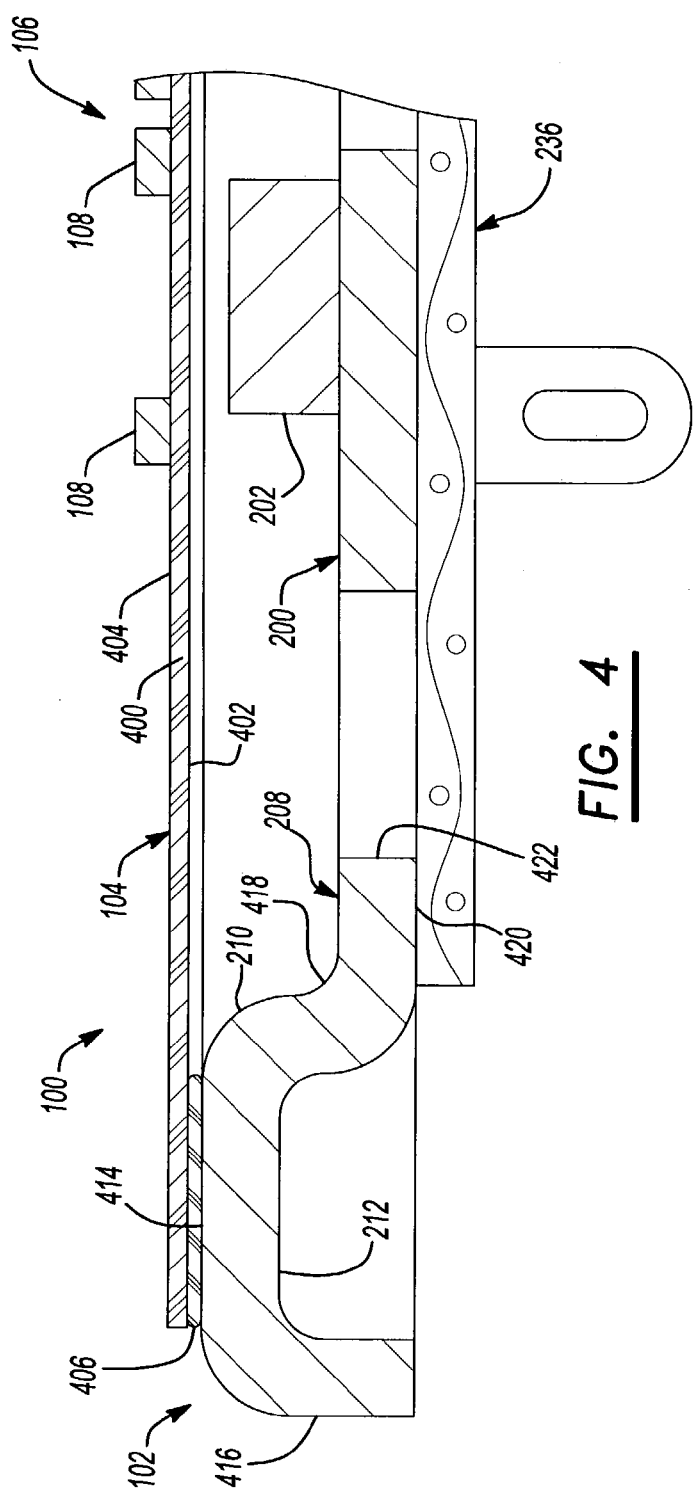

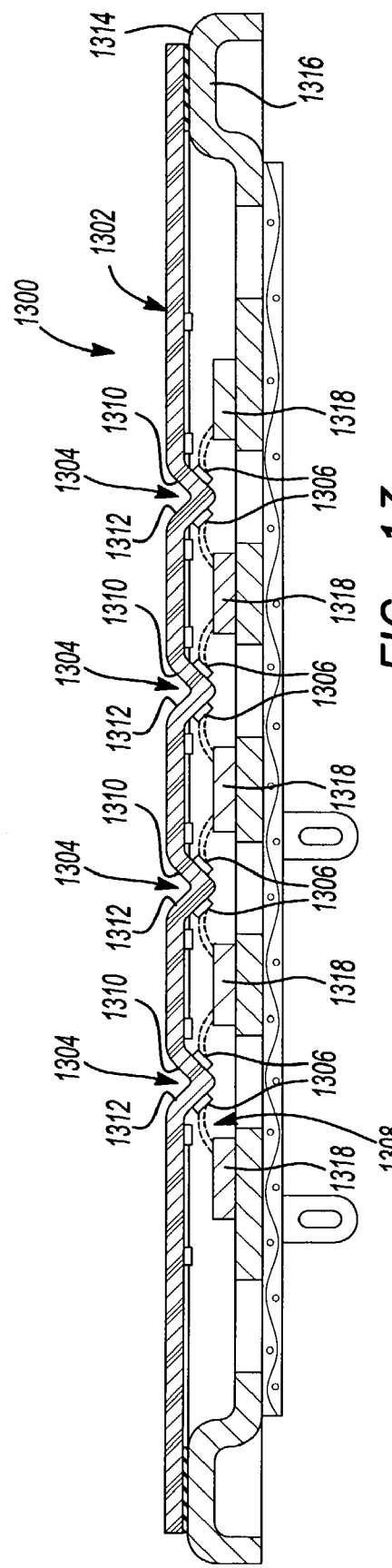
FIG. 13
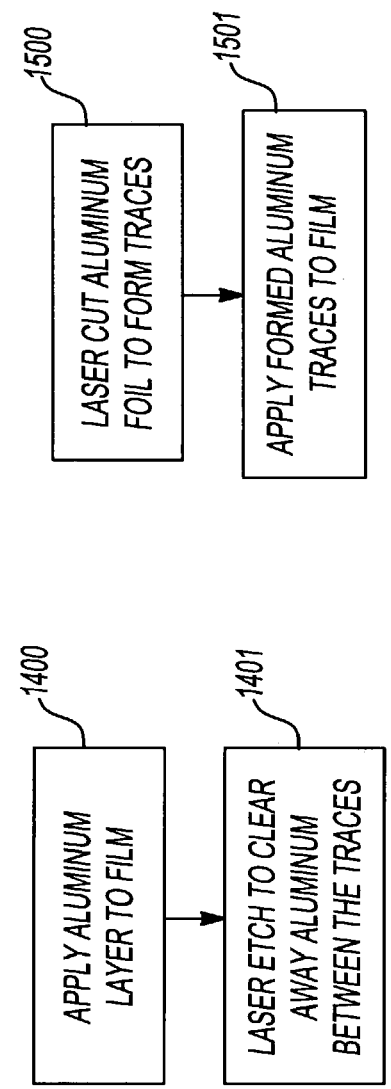
FIG. 14
FIG. 15

CONDUCTORS FOR ELECTRO-DYNAMIC LOUDSPEAKERS

CROSS REFERENCE TO RELATED APPLICATIONS

This application claims the benefit of U.S. Provisional Application Nos. 60/380,001, filed May 2, 2002, 60/378,188, filed May 6, 2002, and 60/391,134, filed Jun. 24, 2002, and is incorporated by reference.

CROSS REFERENCE TO CO-PENDING APPLICATIONS

This application incorporates by reference the disclosures of each of the following co-pending applications which have been filed concurrently with this application: U.S. patent application Ser. No. 10/428,313, entitled "Mounting Bracket System," filed May 2, 2003; U.S. patent application Ser. No. 10/429,165, entitled "Film Tensioning System," filed May 2, 2003; U.S. patent application Ser. No. 10/428,316, entitled "Film Attaching System," filed May 2, 2003; U.S. patent application Ser. No. 10/429,228, entitled "Electrical Connectors For Electro-Dynamic Loudspeakers," filed May 2, 2003; U.S. patent application Ser. No. 10/428,314, entitled "Electro-Dynamic Loudspeaker Mounting System," filed May 2, 2003; U.S. patent application Ser. No. 10/429,164, entitled "Frame Structure," filed May 2, 2003; U.S. patent application Ser. No. 10/429,289, entitled "Acoustically Enhanced Electro-Dynamic Loudspeakers," filed May 2, 2003; U.S. patent application Ser. No. 10/429,162, entitled "Directivity Control Of Electro-Dynamic Loudspeakers," filed May 2, 2003; U.S. patent application Ser. No. 10/429,243, entitled "Frequency Response Enhancements For Electro-Dynamic Loudspeakers," filed May 2, 2003; and U.S. patent application Ser. No. 10/429,163, entitled "Magnet Arrangement For Loudspeaker," filed May 2, 2003.

BACKGROUND OF THE INVENTION

1. Field of Invention

This invention relates to electro-dynamic loudspeakers, and more particularly to conductors used in electro-dynamic loudspeakers.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

While conventional electro-dynamic loudspeakers are shallow in depth and may therefore be preferred over conventional loudspeakers for use in environments requiring thin loudspeakers, electro-dynamic loudspeakers have a generally rectangular planar radiator that is generally relatively large in height and width to achieve acceptable operating wavelength sensitivity, power handling, maximum sound pressure level capability and low-frequency bandwidth. Unfortunately, the large rectangular size results in a high-frequency beam width angle or coverage that may be too narrow for its intended application. The high-frequency horizontal and vertical coverage of a rectangular planar radiator is directly related to its width and height in an inverse relationship. As such, large radiator dimensions exhibit narrow high-frequency coverage and vice versa.

The frame of the electro-dynamic loudspeakers supports the magnets, the diaphragm, and the terminal leads. A ferrous steel frame has the advantage of carrying magnetic flux that can improve efficiency over a non-ferrous frame. However, frames constructed from non-ferrous or non-metallic materials provide other manufacturing advantages. The frame presents design challenges since it is preferably rigid enough to keep the diaphragm film tension uniform and capable of not deforming during handling, assembly, or over time. The frame also should be capable of withstanding environmental high temperatures, humidity, salt, spray, etc., and be capable of bonding with the diaphragm film.

Other features affecting the acoustic characteristics of the electro-dynamic loudspeaker include damping of undriven portions of the diaphragm film in order to help reduce distortion and smooth frequency response. Damping is required to control film edges by reducing unproductive vibration.

Furthermore, the control directivity of sound is critical for a good system design and acoustical interaction in the listening environment. The electro-dynamic loudspeakers exhibit defined acoustical directivity relative to frequency and to their shape and also relative to the distance from the source. In addition, other frequency response enhancements can also be made to the current electro-dynamic loudspeaker designs.

With the dimensional flexibility obtained with an electro-dynamic loudspeaker, various locations in automotive and non-automotive vehicles may be employed to house electro-dynamic loudspeakers. Different locations offer various advantages over other locations. The thin depth of the electro-dynamic loudspeaker allow them to fit where conventional loudspeakers would not. The final assembly may be mounted on a vehicle, and therefore, must be rigid during shipping and handling and should not allow the diaphragm or frame to deform during installation. The final assembly may be mounted on a vehicle, and therefore, must be rigid during shipping and handling and should not allow the diaphragm or frame to deform during installation.

SUMMARY

This invention provides several conductor arrangements for electro-dynamic loudspeakers. In one arrangement, a wire conductor may be attached to the surface of a diaphragm of an electro-dynamic loudspeaker. A fixture including retractable spindles is provided for wrapping the wire conductor in specific pattern having a plurality of linear sections. The fixture is then placed adjacent to a film material and the retractable spindles are retracted so that the wire conductor is applied to the film material.

In another arrangement, a conductor is attached to the surface of a diaphragm where the conductor is ribbon-shaped with a flat cross-section having a pair of side edges and a pair of relatively wide faces. The conductor may be attached to the diaphragm along one of the side edges so as to be suspended below one surface of the diaphragm and extend toward the magnets that are positioned and mounted to the frame.

Another arrangement includes suspending the conductor below the upper edge surface of the frame while being supported on channels that are formed in the diaphragm. By suspending the conductors below the upper edge surface of the frame, the conductor traces are placed in closer proximity to the magnetic field generated by the magnets mounted to the frame.

In an alternative arrangement an electrical conductor is formed by applying a layer of foil to a film material and laser etching the foil to remove portions of the foil in order to define a conductor having a plurality of linear sections.

Also, an electrical conductor may be formed on the diaphragm by laser cutting the conductor material in order to form a plurality of linear sections from the material and applying the conductor to a film material.

An electrical conductor may also be formed by applying a layer of foil to a film material utilizing an electron discharge machining technique for burning an image of electrode onto the surface of the film. The electrode would be formed as the desired shape of the areas of foil to be removed, thus leaving the remaining foil material in the desired shape of the conductor.

An electrical conductor may also be formed by applying a mask over the foil in the desired shape of the conductor and the uncovered foil is then abrasively removed using known techniques such as water jet cutting using an abrasive slurry.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views

FIG. 3 is a cross-sectional view taken along line 3—3 of FIG. 1.

FIG. 4 is a detail cross-sectional view of the encircled area of FIG. 3.

FIG. 13 is a cross-sectional view of an electro-dynamic loudspeaker having a film deformed to suspend the electrical traces downward towards the magnets.

FIG. 14 is a flowchart illustrating the steps for forming an electrical conductor on a diaphragm by laser etching.

FIG. 15 is a flowchart illustrating the steps of forming an electrical conductor by laser cutting the conductor from an aluminum foil and applying the conductor to a film.

DETAILED DESCRIPTION

Figure 1:
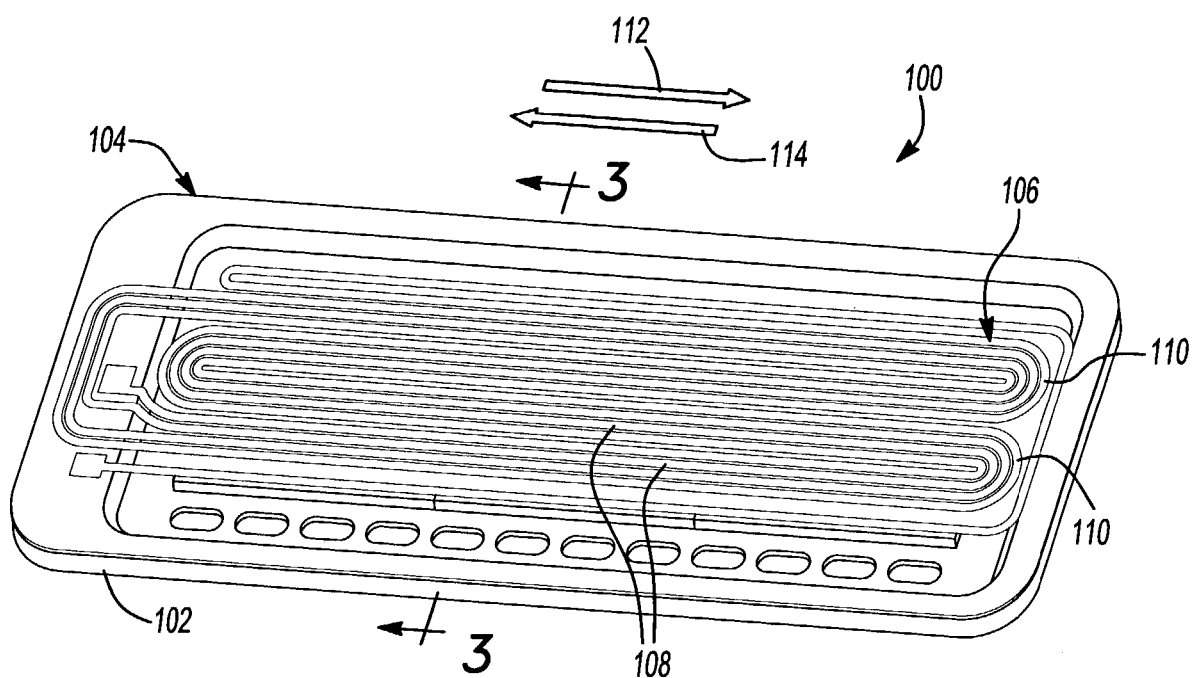
FIG. 1 is a perspective view of an electro-dynamic loudspeaker.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
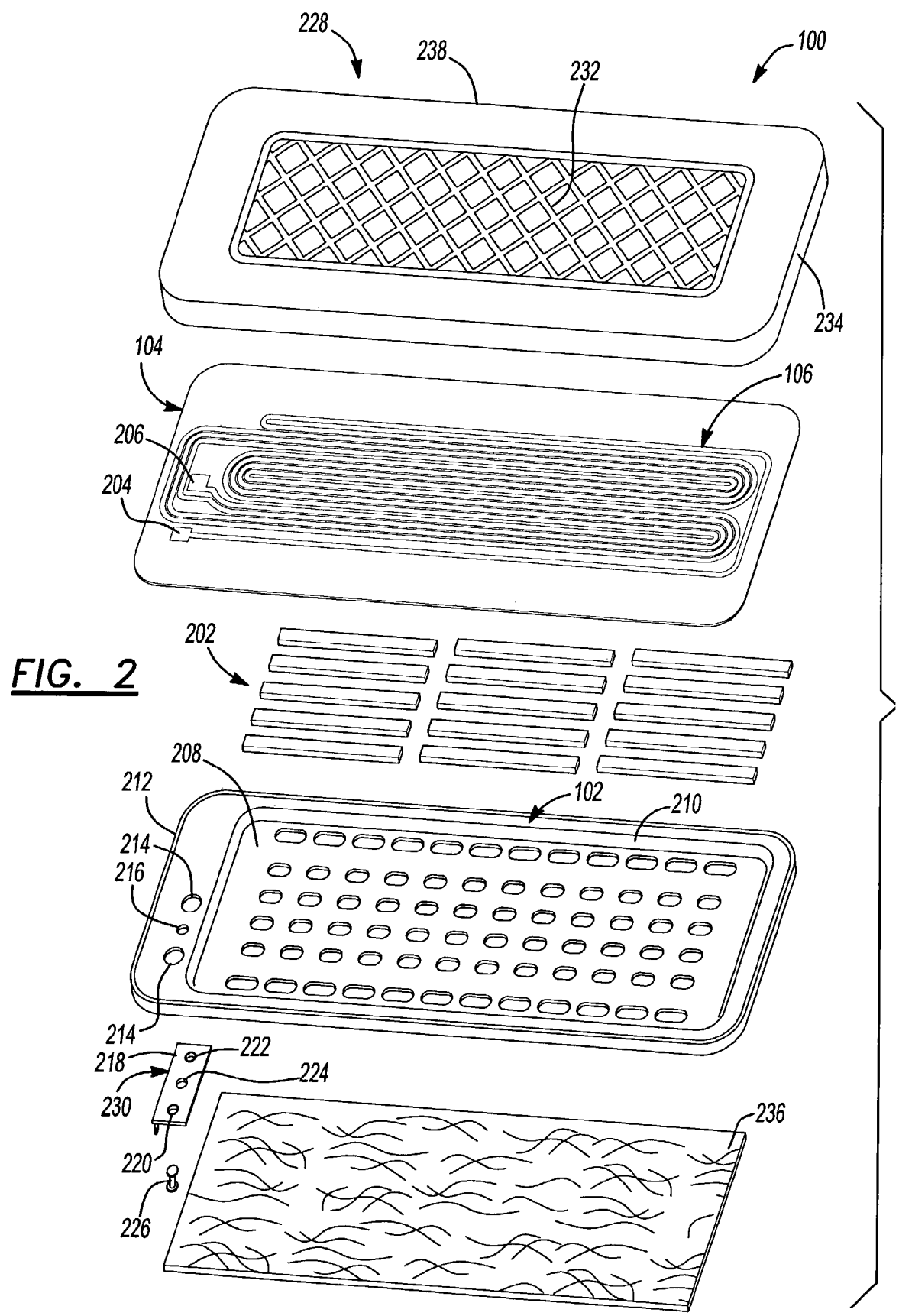
FIG. 2 is an exploded perspective view of the electro-dynamic loudspeaker shown in FIG. 1.
Figure 5:
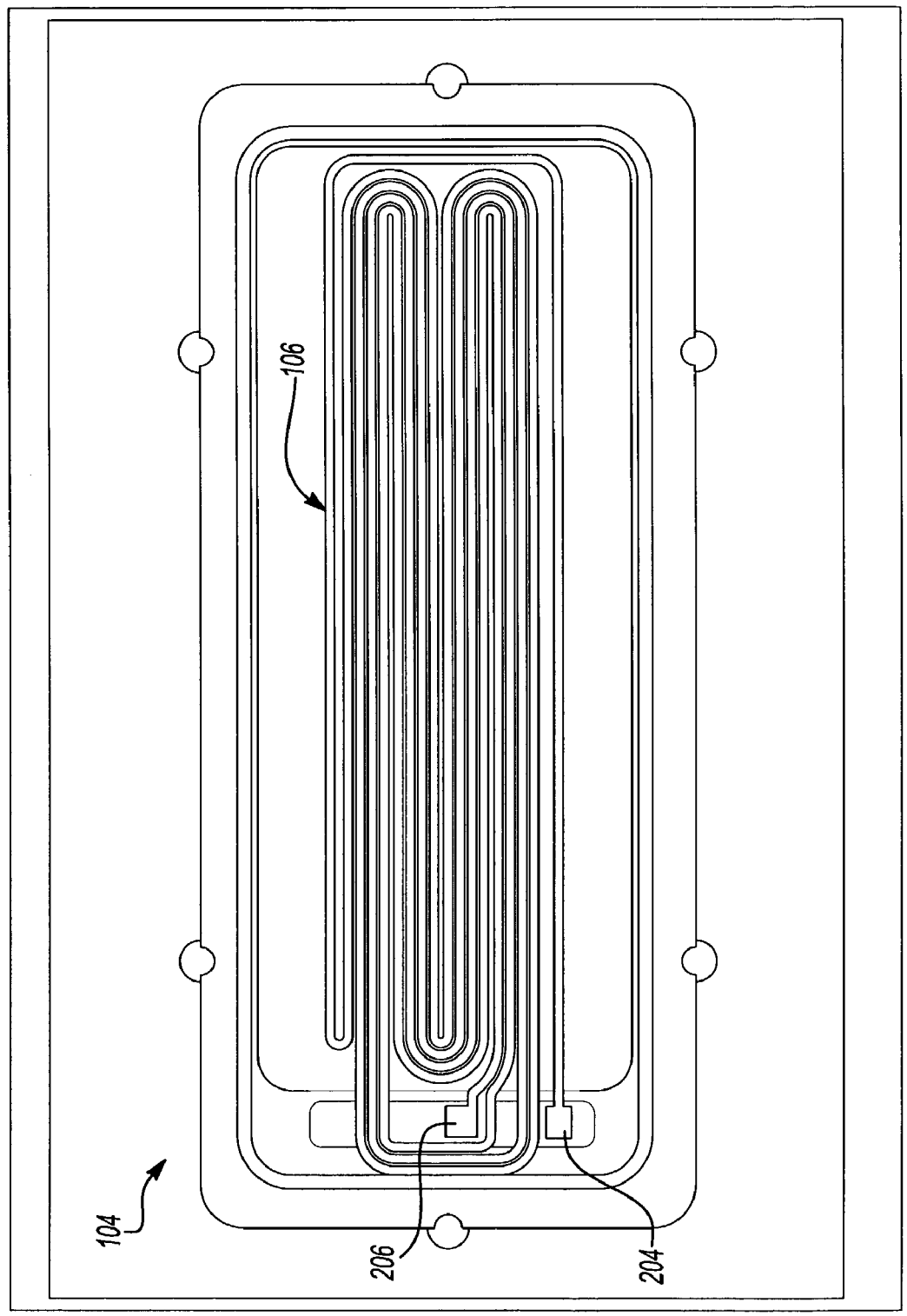
FIG. 5 is a plan view of the film having an attached conductor.
Figure 6:
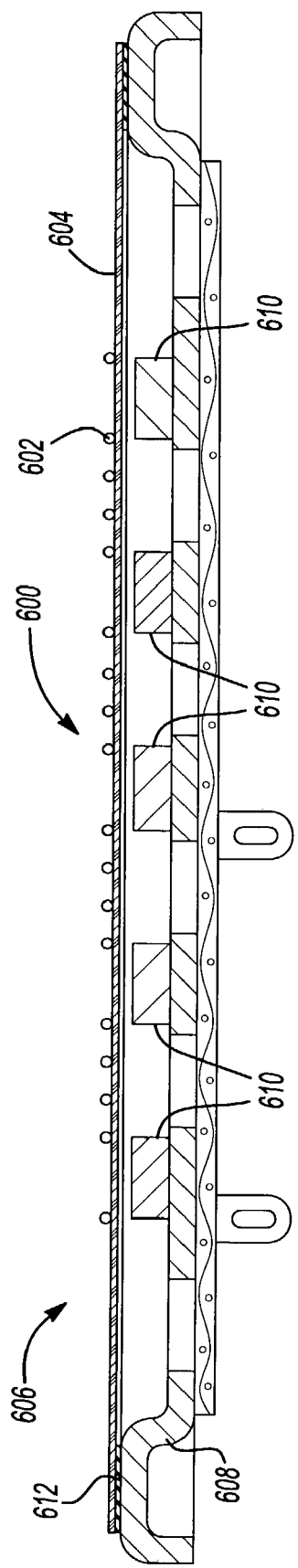
FIG. 6 is a cross-sectional view of an electro-dynamic loudspeaker having an alternative embodiment employing a wire conductor.
Figure 7:
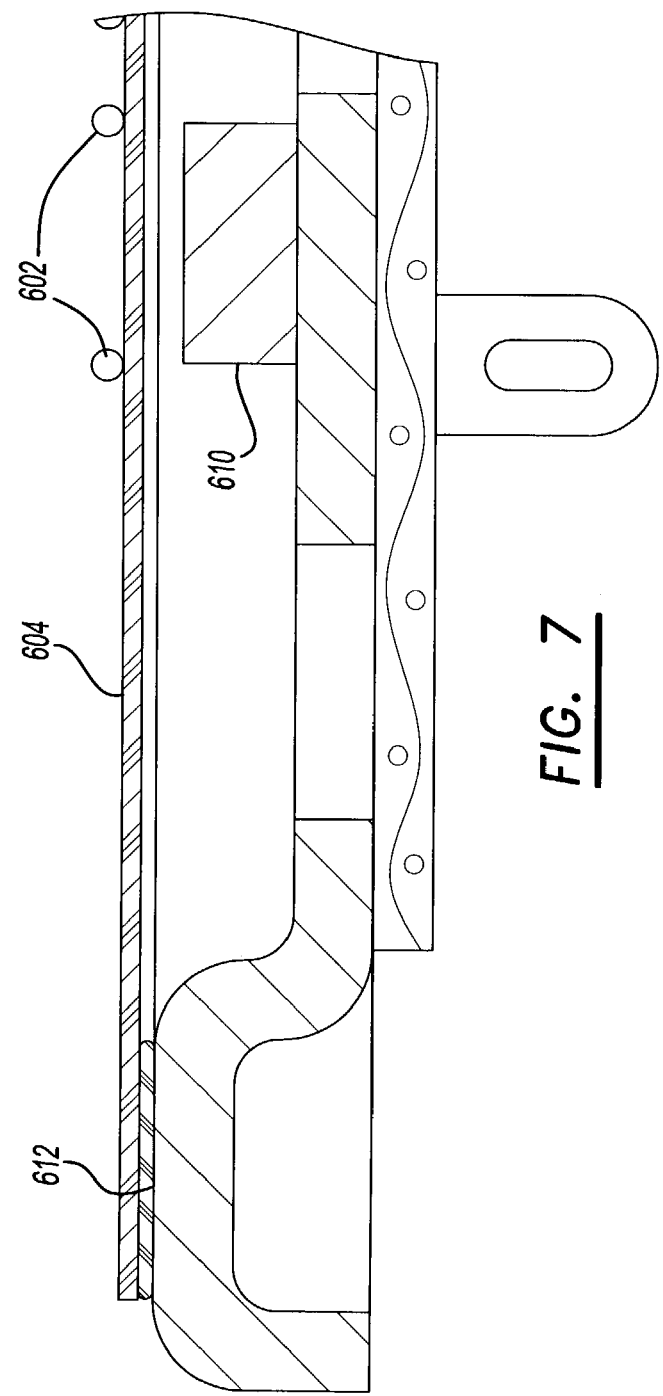
FIG. 7 is a detailed cross-sectional view of the encircled area of FIG. 6.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a conductor assembly 230.

Conductor assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 to electrically couple first terminal 220 to first end 204 and second terminal 222 to second end 206 of conductor 106. A fastener such as a rivet 226 extends through apertures 224 and 216 to couple conductor assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

FIG. 3 is a cross-sectional view of the electro-dynamic loudspeaker taken along line 3—3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102. Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame 102 in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately 0.001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

Conductor 106, as shown in FIG. 1, may be formed by bonding an aluminum foil to the film 400 and chemically etching away portions of the aluminum foil in order to define the linear sections 108 and radii 110 of the conductor 106. Accordingly, it is desirable to provide additional methods of forming the conductor on a diaphragm of an electro-dynamic loudspeaker that is capable of carrying current, preferably has a low mass, and is permanently attached to the film even at high power and high temperature implementations.

FIGS. 6–10 show the forming of a conductor 600 by attaching magnet wire 602 to the film 604. The conductor 600, which is comprised of magnet wire, may be arranged in a serpentine fashion and applied to the film 604 by an adhesive. As is the case with the electro-dynamic loudspeaker described above with reference to FIGS. 1–5, the electro-dynamic loudspeaker 606 includes a frame 608 having a plurality of magnets 610 mounted therein as is described above. The film 604 is attached to the frame 608 by an adhesive 612.

Figure 8:
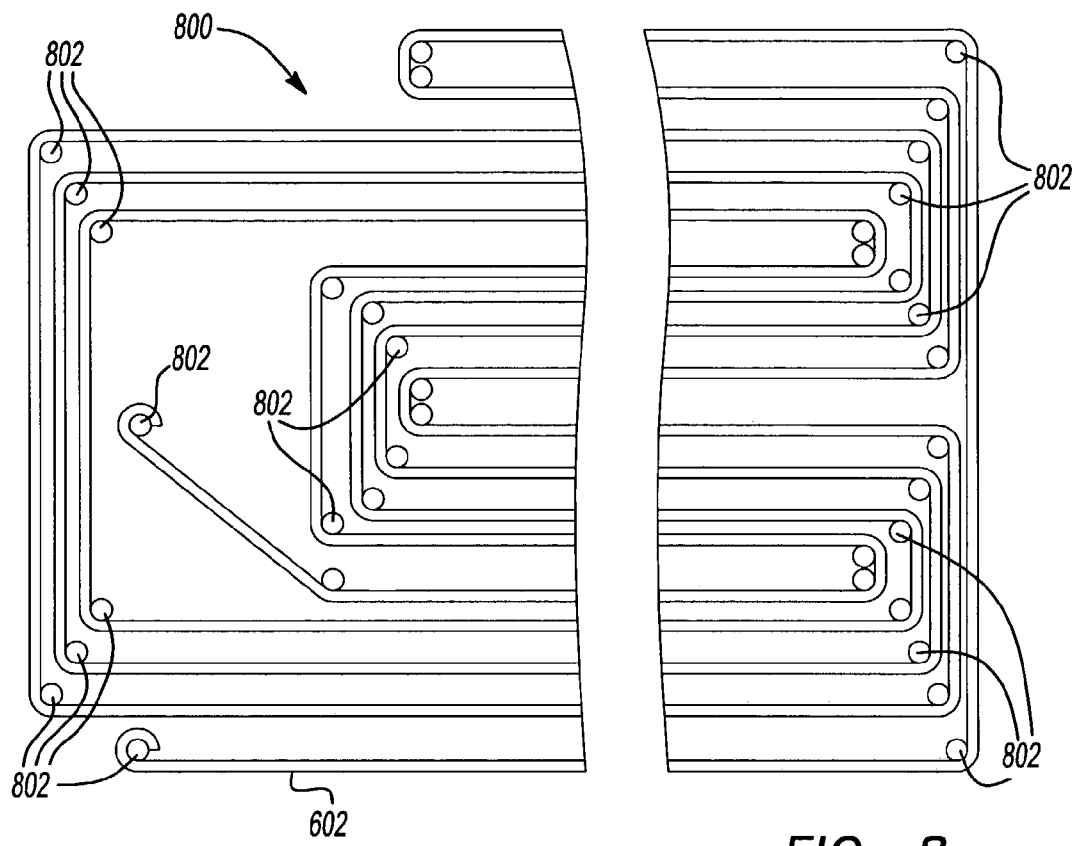
FIG. 8 is a plan view of a fixture for forming the wire conductor.
Figure 10:
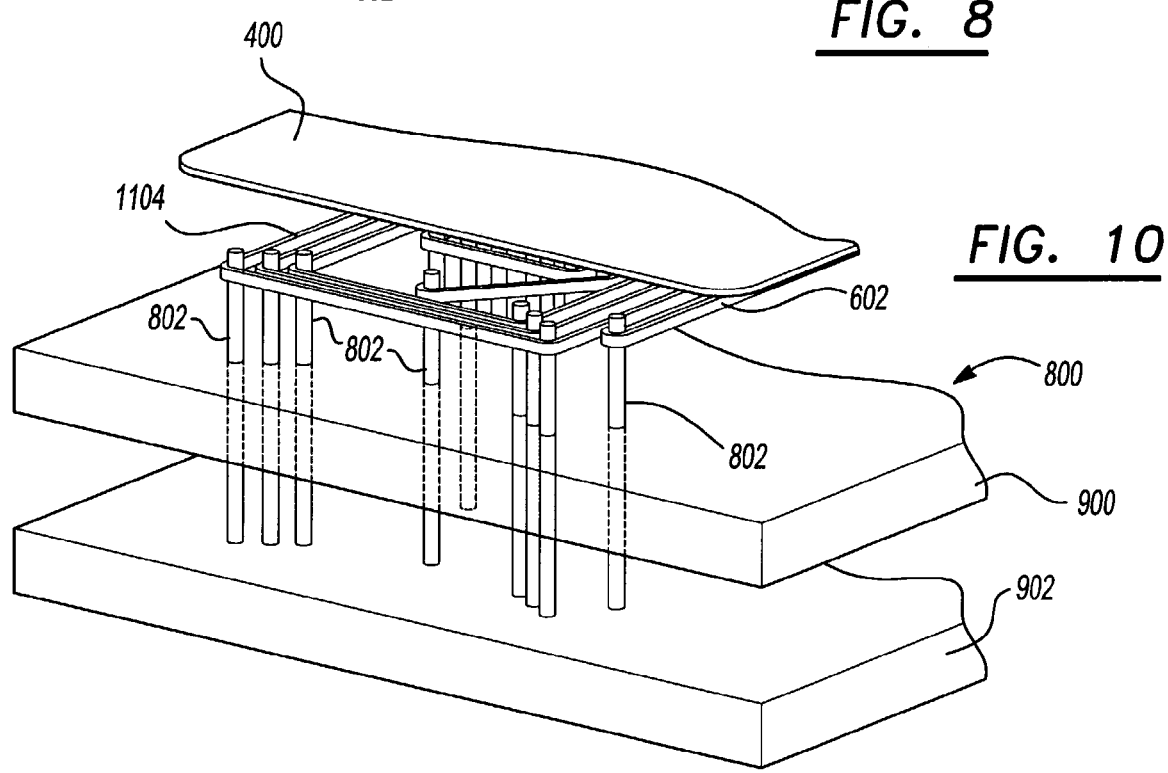
FIG. 10 is a detailed perspective view of the fixture of FIG. 8 for forming the wire conductor.
Figure 9:
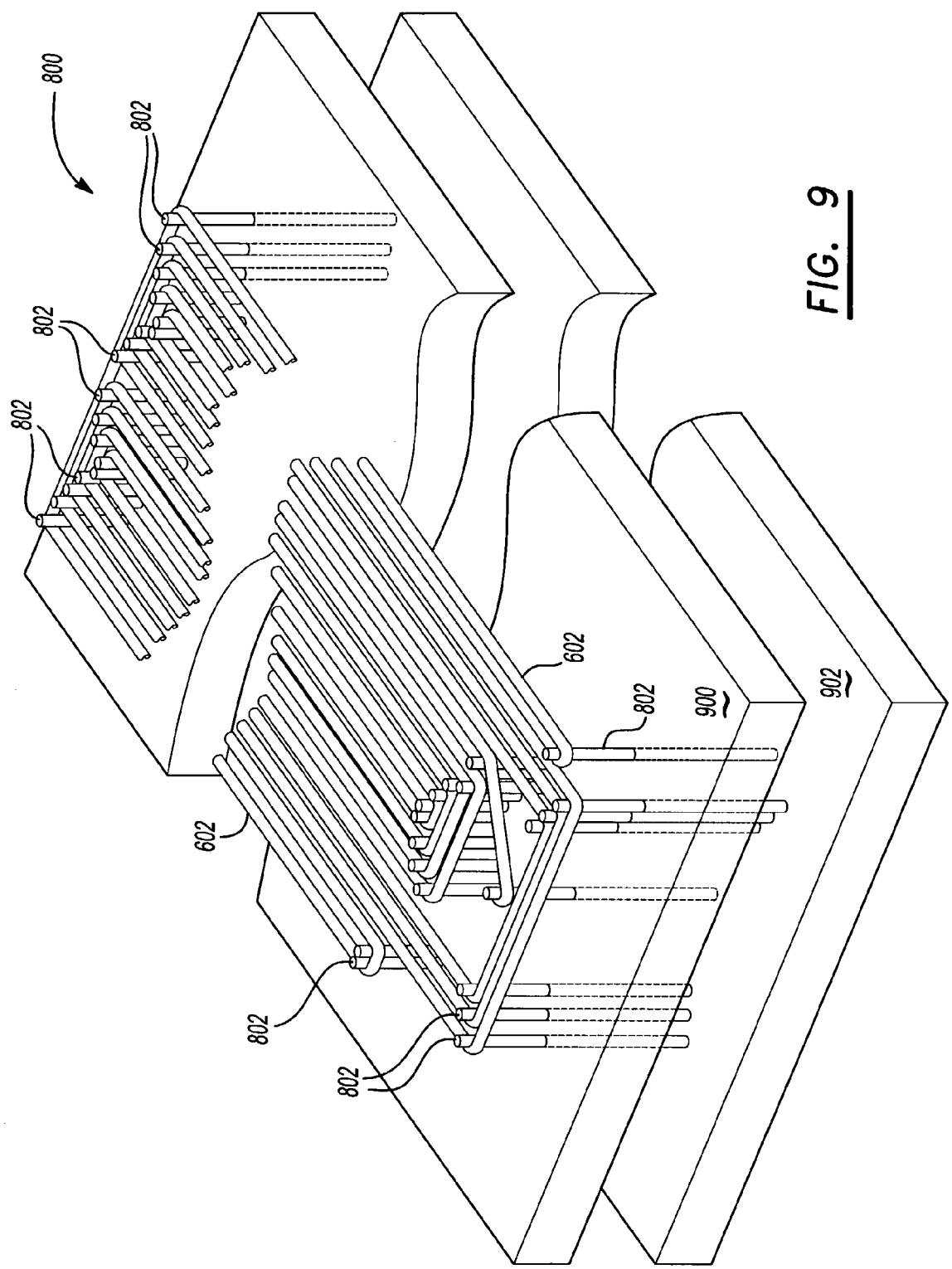
FIG. 9 is a perspective view of the fixture of FIG. 8 for forming the wire conductor.

In FIGS. 8–10, a method for forming the magnet wire 602 in a serpentine configuration is shown, including a fixture 800 having a plurality of retractable spindles 802 around which the magnet wire 602 is wound in a serpentine pattern as illustrated in FIGS. 8 and 9. The fixture 800 includes an upper plate 900 and a retractable plate 902 to which the spindles 802 are fixedly connected. The spindles 802 pass through apertures provided in the upper plate 900. After the magnet wire 602 is wound around the spindles 802, the fixture 800 is disposed adjacent to a film material and the retractable plate 902 is moved away from the upper plate 900 so as to cause the spindles 802 to retract. Once the spindles 802 are retracted to the point that their extension is less than a diameter of the magnet wire 602, the magnet wire 602 comes in contact with the film material. According to a preferred embodiment, the magnet wire 602 is coated with an adhesive which fixes the magnet wire 602 in the serpentine configuration to the film material. Optionally, a light can be shown through the film material in order to speed up the curing process of the adhesive that is applied to the magnet wire in order to more rapidly cure the adhesive. Once the adhesive is given appropriate time to cure, the spindles 802 are completely retracted so as to free the spindles from the magnet wire 602. The spindles 802 can be formed of a self-lubricating material or can be highly polished, or both, in order to reduce the friction between the spindles 802 and the magnet wire 602. In addition, the spindles 802 can be chemically treated to resist bonding with the adhesive applied to the magnet wire 602. The conductor 600 can be applied to the film 400 either prior to or after the film has been mounted to the frame 102 of the electro-dynamic loudspeaker.

Figure 11:
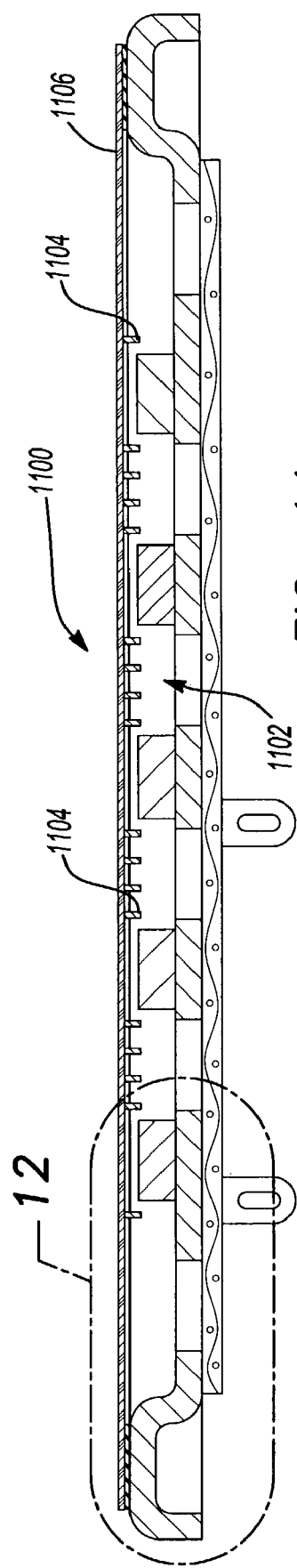
FIG. 11 is a cross-sectional view of an electro-dynamic loudspeaker having a ribbon-shaped conductor mounted to an underside of the film.
Figure 12:
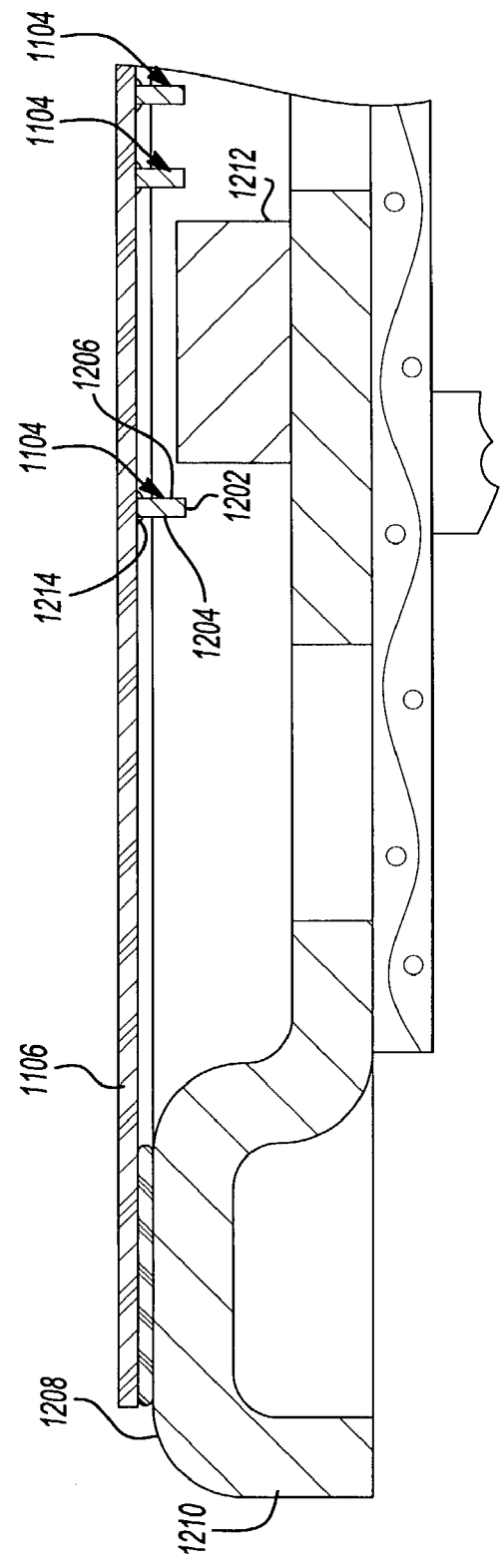
FIG. 12 is a detail cross-sectional view of the encircled area of FIG. 11.

In FIGS. 11 and 12, an electro-dynamic loudspeaker 1100 is provided with a conductor 1102 that is formed by ribbon-shaped wire 1104 which is provided with two narrow side edges 1200, 1202 and a pair of relatively wide faces 1204, 1206. The ribbon-shaped conductor preferably extends below an upper attachment surface 1208 of the frame 1210. By suspending the ribbon-shaped conductor below the upper attachment surface 1208 of the frame 1210, the conductor 1102 extends towards the magnets 1212 so as to be closer to the magnetic field lines generated by the magnets 1212. The ribbon-shaped conductor 1102 is attached to the film 1106 by an adhesive 1214 and can be formed in the same manner as the wire conductor 600 described above. In other words, the ribbon-shaped wire 1104 can be wrapped around a fixture such as that disclosed in FIGS. 8–10 (FIG. 10 shows the ribbon-shaped wire 1104) and applied to the film 1106 in the same manner as described above. By placing the ribbon-shaped conductor 1102 closer to the magnetic field, the intensity of the magnetic field lines are increased to allow a reduced strength magnet 1212 to be utilized which results in a cost savings for the manufacture of the electro-dynamic loudspeaker 1100. Alternatively, the performance can be enhanced by taking advantage of the stronger magnetic flux density with the ribbon-shaped conductor being closer to the magnetic field.

Figure 17:
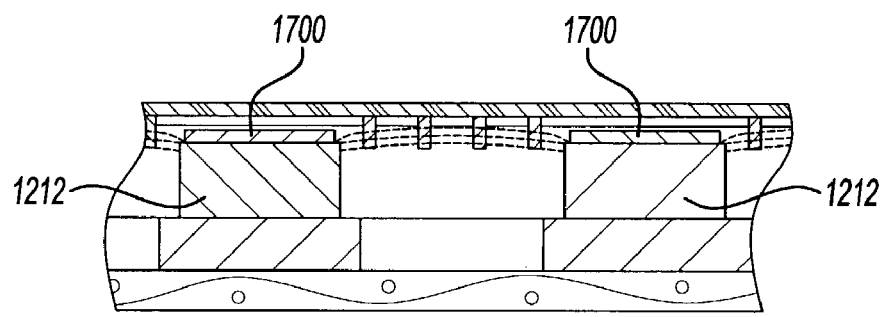
FIG. 17 is a cross-sectional view illustrating the magnetic field through the ribbon shaped conductors with caps provided on the magnets for focusing the magnetic field direction through the conductor traces.
Figure 18:
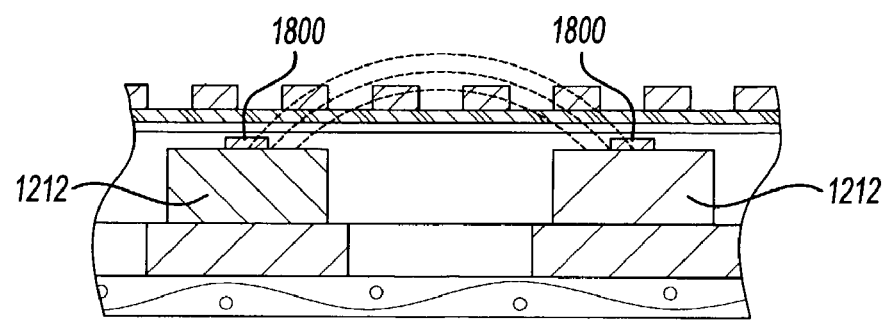
FIG. 18 is a cross-sectional view illustrating the magnetic field lines created by magnets having smaller caps.

In FIG. 17, cap members 1700 can optionally be applied to the upper surface of the magnets 1212 in order to focus the magnetic field lines in a preferred direction relative to the conductor 1102. Although the cap members are shown in combination with a ribbon-shaped conductor 1102, the shape and configuration of the cap members 1700 can be varied in order to provide a desired magnetic field. As shown in FIG. 18, smaller caps 1800 permit a different shaped magnetic field for use with different configurations of conductors. The cap members 1700, 1800 are preferably made from a ferrous material and can be glued or otherwise held in place on the upper surface of the magnets 1212.

FIG. 13 illustrates an electro-dynamic loudspeaker 1300 having a diaphragm 1302 that has channels 1304 formed in the diaphragm 1302 and has electrical traces 1306 of a conductor 1308 disposed on opposite angularly disposed faces 1310, 1312 of the channels 1304. The channels 1304 allow the traces 1306 to be suspended below an upper attachment surface 1314 of the frame 1316 so that the traces 1306 can be placed within the higher intensity magnetic field lines generated by the magnets 1318. The film 1302 preferably has a thickness of between 2–5 mills in order to provide an appropriate rigidity for forming the channels 1304. The channels 1304 are formed by placing the film 1302 in a heated mold provided with upper and lower die members provided with a channel-shaped protrusion in one die member and a channel-shaped recess in the other die member so as to permanently deform the film member 1302 into the configuration shown in FIG. 13. The film 1302 can be deformed prior to or after the conductor 1308 is applied thereto. The ability to place the conductor traces 1306 within the higher intensity magnetic field lines facilitates the use of weaker magnets than are typically required for an electrodynamic loudspeaker. The reduced strength magnets 1318 therefore contribute to a lesser expensive electro-dynamic loudspeaker 1300.

FIG. 14 illustrates a flowchart of an alternative method for forming the conductor on the film of an electro-dynamic loudspeaker. At Step 1400, an aluminum foil layer is applied to a film using an adhesive. At Step 1401, a laser is utilized to etch away aluminum from the surface of the film in order to define the traces of the conductor. During the laser etching process, coolant fluid can be sprayed at the film material in order to cool the film material to prevent damage thereto due to the heat generated by the laser etching process. Lasers of this type are currently used to cut vias in printed circuit boards but have not been utilized for removing a conductive material from a laminate.

Figure 16:
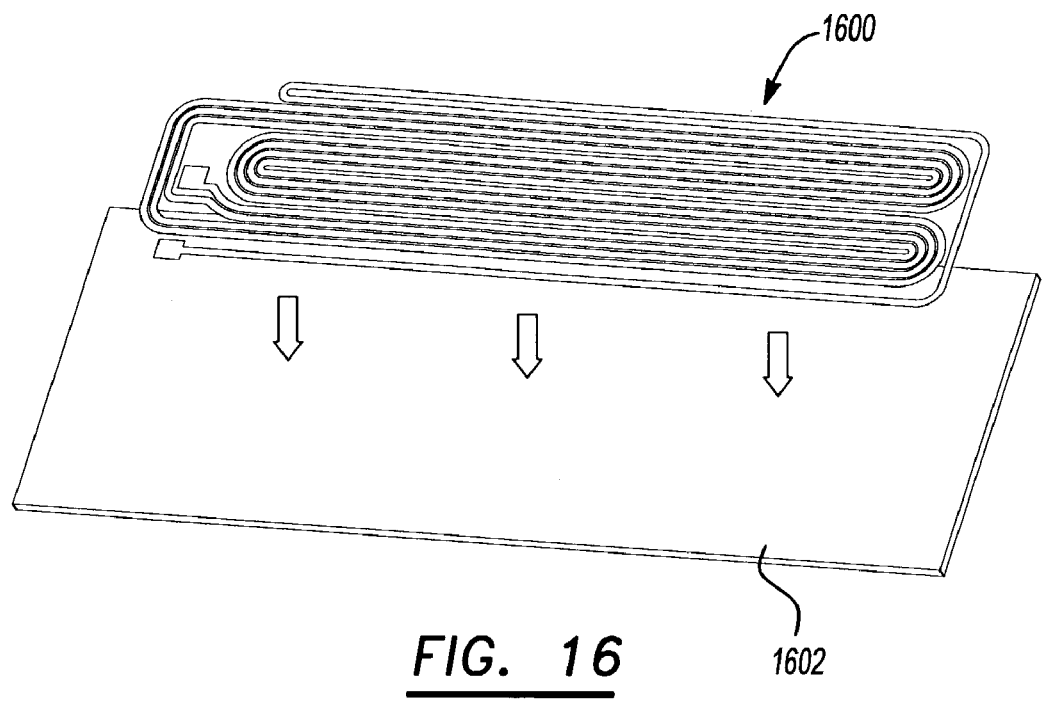
FIG. 16 is a perspective view illustrating attaching the conductor to the film.

FIGS. 15 and 16 illustrate an alternative method of forming the conductor where the conductor is laser cut from an aluminum foil in order to form flat traces 1600. At Step 1501, the conductor traces 1600 are applied to a film 1602. Adhesive is applied to a surface of the aluminum foil prior to laser cutting and the adhesive is cured by passing selective bands of light through the film material 1602 in order to more rapidly cure the adhesive.

Figure 19:
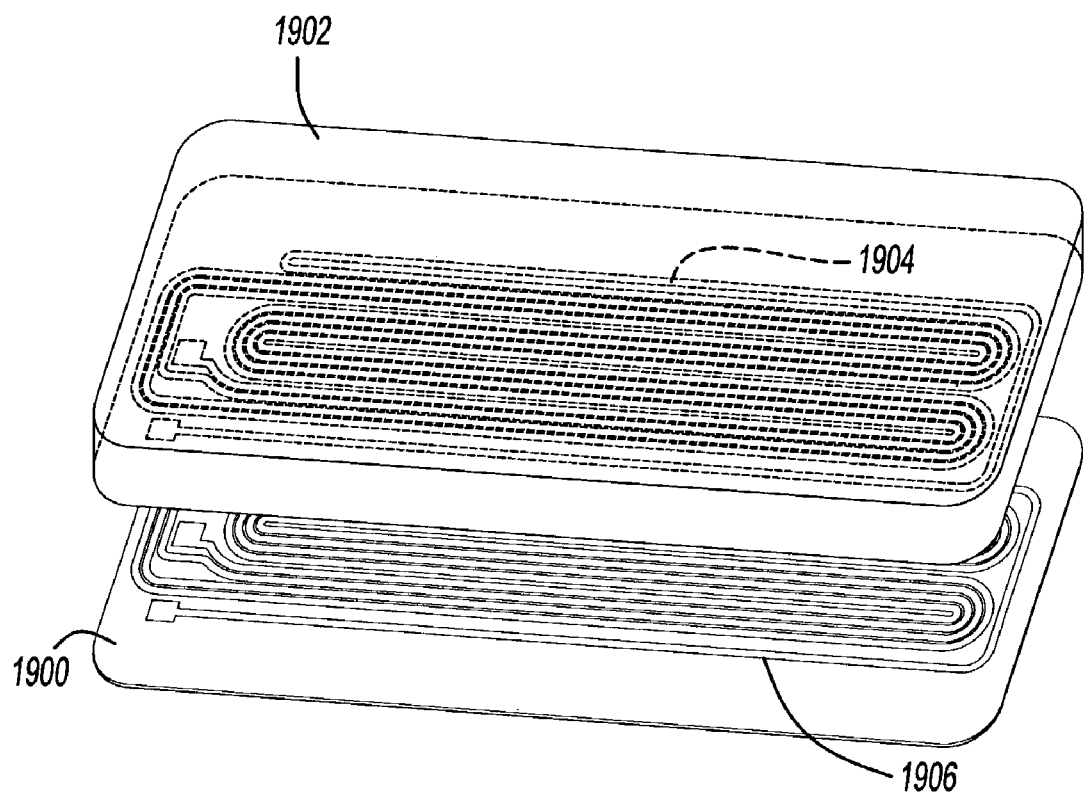
FIG. 19 is a schematic perspective view of an electron discharge machining process for forming an electrical conductor on a film.

FIG. 19 illustrates a method of forming an electrical conductor on a film is illustrated using an electron discharge machining (EDM) process. The film 1900 is provided with a layer of foil and an electrode plate 1902 having a face configuration with a void 1904 (shown in phantom in FIG. 19 on the underside of the plate 1902) in the desired shape of the electrical conductor. The electrode plate 1902 is brought in close proximity to the foil layer on the film 1900 and through a known "burning" process, an arc is formed from the electrode plate and "burns away" or otherwise removes the foil material so that the remaining foil is in the shape of the void 1904, which is in the desired shape of the electrical conductor 1906, as shown in FIG. 19. The electron discharge machining process is carried out with the electrode and workpiece immersed in a machining fluid which is a dielectric; i.e., an insulating medium. To generate a spark between the two parts, a voltage higher than the breakdown voltage of the gap is applied. This breakdown voltage depends on the distance between the two electrodes at their closest point, the insulating characteristic of the dielectric fluid, and the level of pollution in the gap.

At the point in the gap where the electric field is strongest a discharge commences which then develops as follows:

(a) Under the effect of the electric field, the free positive ions and electrons are accelerated, acquiring a high velocity and, very rapidly, they form an electrically-conductive ionized channel.

(b) At this stage, current can pass through the channel. A spark is initiated between the electrodes and a plasma is formed. This rapidly attains a very high temperature, expanding under the effect of numerous impacts of charged particles and causing instantaneous local melting of material at the surface of both conductors.

At the same time, due to vaporization of the electrodes and of the dielectric fluid, a gas bubble expands, and its pressure increases. At the moment the current is cut off, the gas bubble implodes due to the sudden fall of temperature, generating dynamic forces that results in melted material being ejected from the crater. This melted material is re-solidified in the dielectric fluid as small spheres and flushed away.

Figure 20:
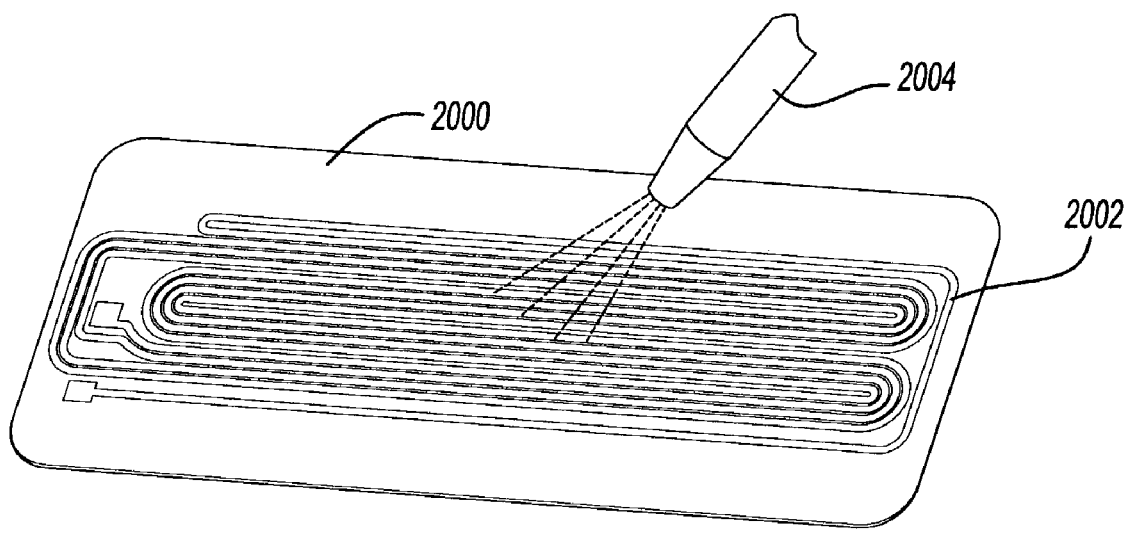
FIG. 20 is a schematic perspective view of an abrasive removing process for forming the electrical conductor on a film.

FIG. 20 illustrates a method of forming an electrical conductor on a film is illustrated. In the process, a foil, such as aluminum, is applied to a film 2000. A mask 2002 in the desired shape of a conductor is applied to the foil. An abrasive removing process is then employed to remove the foil in the unmasked areas. Preferably, a water jet device 2004 can be used with an abrasive slurry for abrading away the unmasked foil surface in order to leave the masked conductor shaped foil on the film 2000. Other known abrasive and polishing type processes can also be employed for abrasively removing the foil from the unmasked areas.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. An electro-dynamic loudspeaker, comprising:
   a frame;
   a diaphragm attached to the frame;
   a conductor attached to a surface of the diaphragm, the conductor having a ribbon-shaped structure including a flat cross-section where the side edges are narrower than faces, and where the conductor is attached to the diaphragm along one of the side edges forming a plurality of linear sections; and
   a layer of an acoustical dampener attached to a side of the frame opposite the diaphragm.

2. The electro-dynamic loudspeaker according to claim 1 where the conductor is attached to the diaphragm by an adhesive.

3. The electro-dynamic loudspeaker according to claim 1, further comprising a plurality of magnets mounted to the frame.

4. The electro-dynamic loudspeaker according to claim 3, where the magnets are arranged in columns and the linear sections of the conductor are positioned above spaces separating the magnets.

5. The electro-dynamic loudspeaker according to claim 1, where the conductor extends toward the frame.

6. An electro-dynamic loudspeaker, comprising:
   a frame forming a radially extending flange;
   a diaphragm attached to the radially extending flange of the frame;
   a plurality of magnets mounted to the frame;
   a conductor attached to a surface of the diaphragm and extending toward the frame, the conductor having a ribbon-shaped structure including a flat cross-section where the side edges are narrower than faces, and where the conductor is attached to the diaphragm along one of the side edges forming a plurality of linear sections; and
   a layer of an acoustical dampener attached to a side of the frame opposite the diaphragm.

7. The electro-dynamic loudspeaker according to claim 6 where the conductor is attached to the diaphragm by an adhesive.

8. The electro-dynamic loudspeaker according to claim 6, where the magnets are arranged in columns and the linear sections of the conductor are positioned above spaces separating the magnets.

9. An electro-dynamic loudspeaker, comprising:
   a frame forming a radially extending flange having a substantially planar mounting surface;
   a diaphragm attached to the substantially planar mounting surface of the radially extending flange of the frame;
   a plurality of magnets mounted to the frame;
   a conductor attached to a surface of the diaphragm, the conductor having a ribbon-shaped structure including a flat cross-section where the side edges are narrower than faces, and where the conductor is attached to the diaphragm along one of the side edges forming a plurality of linear sections suspended below one surface of the diaphragm and toward the plurality of magnets; and a layer of an acoustical dampener attached to a side of the frame opposite the diaphragm.

10. The electro-dynamic loudspeaker according to claim 9, where the magnets are arranged in columns and the linear sections of the conductor are positioned above spaces separating the magnets.

11. The electro-dynamic loudspeaker according to claim 3, further comprising a plurality of ferrous cap members, each cap member attached to an upper surface of one of the plurality of magnets.

12. The electro-dynamic loudspeaker according to claim 6, further comprising a plurality of ferrous cap members, each cap member attached to an upper surface of one of the plurality of magnets.

13. The electro-dynamic loudspeaker according to claim 9, further comprising a plurality of ferrous cap members, each cap member attached to an upper surface of one of the plurality of magnets.

* * * * *